(12) United States Patent
Xie et al.

(10) Patent No.: US 9,996,208 B2
(45) Date of Patent: Jun. 12, 2018

(54) TOUCH SCREEN, MANUFACTURING METHOD THEREOF AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Taofeng Xie, Beijing (CN); Lei Zhang, Beijing (CN); Yang Liu, Beijing (CN); Lingyan Wu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 400 days.

(21) Appl. No.: 14/785,702

(22) PCT Filed: Feb. 28, 2015

(86) PCT No.: PCT/CN2015/073402
§ 371 (c)(1),
(2) Date: Oct. 20, 2015

(87) PCT Pub. No.: WO2016/065782
PCT Pub. Date: May 6, 2016

(65) Prior Publication Data
US 2016/0253009 A1    Sep. 1, 2016

(30) Foreign Application Priority Data
Oct. 29, 2014    (CN) .......................... 2014 1 0598235

(51) Int. Cl.
G06F 3/044    (2006.01)
G06F 3/047    (2006.01)
(Continued)

(52) U.S. Cl.
CPC ................ *G06F 3/047* (2013.01); *B05D 5/00* (2013.01); *G06F 3/044* (2013.01); *G06F 3/0416* (2013.01);
(Continued)

(58) Field of Classification Search
CPC ............ G06F 2203/04103; G06F 3/01; G06F 3/0412; G06F 3/044; G06F 2203/04112;
(Continued)

(56) References Cited

U.S. PATENT DOCUMENTS 9,182,861 B2 * 11/2015 Bulea ...................... G06F 3/044
2010/0149108 A1    6/2010 Hotelling et al.
(Continued)

FOREIGN PATENT DOCUMENTS

CN    103150070 A    6/2013
CN    103293735 A    9/2013
(Continued)

OTHER PUBLICATIONS

First Office Action, including Search Report, for Chinese Patent Application No. 201410598235.5, dated Sep. 23, 2016, 13 pages.
(Continued)

*Primary Examiner* — Duc Q Dinh
(74) *Attorney, Agent, or Firm* — Westman, Champlin & Koehler, P.A.

(57) ABSTRACT

The disclosure provides a touch screen which comprises a transparent substrate having a surface which includes a central region and a peripheral region, an electrode array arranged in the central region and formed by a plurality of driving electrodes and a plurality of sensing electrodes, which are arranged on the surface of the transparent substrate, and multiple wires formed on the surface of the transparent substrate for electrically connecting each electrode in the electrode array to an external touch driving
(Continued)

circuit, wherein all the electrodes in the electrode array and the multiple wires are formed by a single-layer metal which is formed on the surface of the transparent substrate. The disclosure further provides a manufacturing method of the touch screen. The manufacturing method comprises the step of forming the driving electrodes, in which the driving electrodes, the sensing electrodes and the wires connecting the electrodes of the touch screen are formed simultaneously of the single-layer metal which are directly formed on the surface of the transparent substrate. The disclosure further provides a display device comprising the touch screen.

13 Claims, 3 Drawing Sheets

(51) Int. Cl.
    *B05D 5/00*     (2006.01)
    *G06F 3/041*     (2006.01)

(52) U.S. Cl.
    CPC ............. *B05D 2203/35* (2013.01); *G06F 2203/04103* (2013.01); *G06F 2203/04112* (2013.01)

(58) Field of Classification Search
    CPC . G06F 2203/04111; G06F 2203/04106; G06F 3/0202; G06F 3/041; G06F 3/0414; G06F 1/1643; G06F 2203/04104; G06F 2203/04113; G06F 3/045; G06F 3/047; G06F 3/04886; G09G 2300/0426; G09G 5/003

USPC .................................................. 345/173–175
See application file for complete search history.

(56) References Cited

U.S. PATENT DOCUMENTS

| | | |
|---|---|---|
| 2012/0319963 A1 | 12/2012 | Lee et al. |
| 2014/0160376 A1 | 6/2014 | Wang et al. |
| 2014/0204290 A1* | 7/2014 | Chen ...................... G06F 3/044 349/12 |
| 2015/0077368 A1* | 3/2015 | Chen ...................... G06F 3/0416 345/173 |

FOREIGN PATENT DOCUMENTS

| | | |
|---|---|---|
| CN | 103713414 A | 4/2014 |
| CN | 103713781 A | 4/2014 |
| CN | 203849700 U | 9/2014 |
| CN | 104281327 A | 1/2015 |

OTHER PUBLICATIONS

International Search Report and Written Opinion for PCT Application No. PCT/CN2015/073402, dated Aug. 4, 2015, 9 pages.
English translation of Box No. V from the Written Opinion for the International Searching Authority for PCT Application No. PCT/CN2015/073402, 2 pages.

* cited by examiner

TOUCH SCREEN, MANUFACTURING METHOD THEREOF AND DISPLAY DEVICE

CROSS-REFERENCE TO RELATED APPLICATION

This application is a Section 371 National Stage Application of International Application No. PCT/CN2015/073402, filed on Feb. 28, 2015, entitled "Touch Screen, Manufacturing Method thereof and Display Device", which has not yet published, which claims priority to Chinese Application No. 201410598235.5, filed on Oct. 29, 2014, incorporated herein by reference in their entirety.

BACKGROUND OF THE INVENTION

Field of the Invention

Embodiments of the present invention generally relate to a technical field of touch display, and in particular, to a touch screen, a manufacturing method thereof and a display device comprising the same.

Description of the Related Art

In recent years, touch technology is widely used in various multimedia electronic products, particularly in portable mobile electronic products, such as cellphone, e-book, tablet computer and the like. The touch technology is used as an input manner to effectively replace the existing input manners in the form of keyboard or mouse. Such a touch input manner is becoming a popular human-computer interaction interface and a multimedia interaction manner due to an intuitive operation as well as convenience.

A conventional touch screen comprises an outermost protective glass, an intermediate touch screen and an innermost display screen. A one glass solution (OGS) is a technology in which an ITO (indium tin oxide) conductive film and a sensor are directly formed on the outermost protective glass, that is, the outermost protective glass and the touch screen are combined into one screen in the OGS technology, reducing the production cost and increasing the rate of qualified products, thus the requirement for super-thin intelligent terminal can be met and the display effect is improved. Therefore, the OGS technology is increasingly used in electronic devices such as intelligent terminal.

The touch screen generally comprises a central active area and a peripheral dummy area, a touch electrode is arranged in the active area and the wire is arranged in the dummy area. However, in the prior art, the ITO wire has a high impedance, such that the number of the wires in a limited dummy area is limited. For example, the available largest width of the dummy area of the existing IC product is 2.1 mm, the number of wires routed in the dummy area is less than 36 if ITO wire width/wire spacing is calculated as 30 μm/30 μm. Thus, the biggest number of driving electrodes (TX) is equal to 36/2, that is, 18, and the largest width of the product is equal to 18*4.5 mm, that is, 81 mm or 8.1 cm, the product will thus be limited to a small-size.

SUMMARY OF THE INVENTION

In order to overcome at least one of the above and other problems and defects in the prior art, the disclosure is provided.

According to an aspect of the embodiments of the present invention, it is provided a touch screen comprising: a transparent substrate having a surface which includes a central region and a peripheral region; an electrode array arranged in the central region and formed by a plurality of driving electrodes and a plurality of sensing electrodes which are arranged on the surface of the transparent substrate; and multiple wires formed on the surface of the transparent substrate for electrically connecting each electrode in the electrode array to an external touch driving circuit, wherein all the electrodes in the electrode array and the multiple wires are formed of single-layer metal which is formed on the surface of the transparent substrate.

In the above touch screen, each electrode in the electrode array has a form of grid consisted of crossed metal traces. Further optionally, the electrode array has a row direction and a column direction, and both the driving electrodes and the sensing electrodes may be alternately arranged in both the row direction and the column direction and may be spaced apart from each other, so as to form multiple rows of electrodes and multiple columns of electrodes.

In the above touch screen, each two adjacent columns of electrodes may constitute an electrode column pair, and each electrode column pair corresponds to one wire for the driving electrode and multiple wires for the sensing electrode in the multiple wires, the one wire for the driving electrode may be electrically connected with all of the driving electrodes in the electrode column pair, and each of the multiple wires for the sensing electrode may be electrically connected to one corresponding sensing electrode in the electrode column pair.

In the above touch screen, at least a portion of each wire for the driving electrode may be arranged in a gap region between two adjacent columns of electrodes of the one corresponding electrode column pair; the wires for the sensing electrode, which are electrically connected with two outermost columns of sensing electrodes in the electrode array, are arranged in the peripheral region; at least a portion of the wires for the sensing electrode, which are electrically connected with the sensing electrodes in the electrode array other than two outermost columns of sensing electrodes, are arranged in a gap region between two adjacent electrode column pairs; and all the multiple wires are converged to a region of bonding pad located at one end of the transparent substrate in the peripheral region.

In the above touch screen, wires for the sensing electrode may extend from the respective sensing electrodes toward the one end in a first direction parallel with the column direction and converge to the region of bonding pad.

Alternatively, wires, which are electrically connected with a portion of sensing electrodes in at least one column of electrodes of the multiple columns of electrodes, may extend from the respective sensing electrodes toward the one end in a first direction parallel with the column direction and converge to the region of bonding pad; and wires, which are electrically connected with the other sensing electrodes in the at least one column of electrodes, may extend from the respective sensing electrodes toward the other end of the transparent substrate opposite to the one end in a second direction opposite to the first direction, then extend along the peripheral region and converge to the region of bonding pad.

The above touch screen may further comprise a black matrix forming in the peripheral region, wherein the black matrix is located under the wires in the peripheral region to prevent the wires in the peripheral region from being seen from the other surface of the transparent substrate opposite to the surface.

According to another aspect of the embodiments of the present invention, it is provided a display device comprising any of the above touch screens.

According to another further aspect of the embodiments of the present invention, it is provided a manufacturing method of a touch screen, comprising steps of:

providing a transparent substrate having a surface including a central region and a peripheral region;

forming a metal layer on the surface; and patterning the metal layer through a single patterning process to form an electrode array in a form of grid in the central region and to form multiple wires, the electrode array comprising a plurality of driving electrodes and a plurality of sensing electrodes, and the multiple wires being configured for electrically connecting each electrode in the electrode array to an external touch driving circuit.

In the manufacturing method, patterning the metal layer through a single patterning process comprises: forming each electrode in the electrode array in a form of grid. Further optionally, forming the driving electrodes and the sensing electrodes, which are spaced apart from each other, alternately both in a row direction of the electrode array and in a column direction thereof.

In the manufacturing method, patterning the metal layer through a single patterning process comprises:

forming an electrode column pair from each two adjacent columns of electrodes;

forming multiple wires for the driving electrode and multiple wires for the sensing electrode from the metal layer;

wherein each wire for the driving electrode is electrically connected with all of the driving electrodes in one corresponding electrode column pair, and the multiple wires for the sensing electrode is electrically connected to respective sensing electrodes in one corresponding electrode column pair.

In the manufacturing method, patterning the metal layer through a single patterning process comprises:

forming at least a portion of each wire for the driving electrode in a first gap region between two adjacent columns of electrodes of the electrode column pair;

forming the wires for the sensing electrode, which are electrically connected with two outermost columns of sensing electrodes in the electrode array, in the peripheral region;

forming at least a portion of the wires for the sensing electrode, which are electrically connected with the sensing electrodes in the electrode array other than two outermost columns of sensing electrodes, in a second gap region between two adjacent electrode column pairs, the second gap region being spaced apart from the first gap region by a column of electrodes; and converging all the multiple wires to a region of bonding pad located at one end of the transparent substrate in the peripheral region.

In the manufacturing method, patterning the metal layer through a single patterning process comprises:

configuring each wire for the sensing electrode to extend from one corresponding sensing electrode toward the one end and converge to the region of bonding pad.

In the manufacturing method, wires, which are electrically connected with a portion of sensing electrodes in at least one column of electrodes, may extend from the respective sensing electrodes toward the one end in a first direction parallel with the column direction and converge to the region of bonding pad; and wires, which are electrically connected with the other sensing electrodes in the at least one column of electrodes, extend from the respective sensing electrodes toward the other end of the transparent substrate opposite to the one end in a second direction opposite to the first direction, then extend along the peripheral region and converge to the region of bonding pad.

The manufacturing method may further comprise: forming a black matrix in the peripheral region before forming the metal layer on the surface, such that the metal layer formed subsequently in the peripheral region is stacked on the black matrix.

The manufacturing method may further comprise: processing the formed metal layer through blackening and shadow eliminating process.

The manufacturing method may further comprise: forming a protective layer covering the electrode array and the multiple wires on the surface.

Other objects and advantages will be obvious in virtue of the following descriptions of the disclosure with reference to accompanying figures, which also may aid to a comprehensive understanding of the present invention.

BRIEF DESCRIPTION OF THE DRAWINGS

The characteristics and advantages of the disclosure will be understood more clearly with reference to accompanying figures. The accompanying figures are merely exemplary, but not to limit the scope of the present invention, in which.

DETAILED DESCRIPTION OF PREFERRED EMBODIMENTS OF THE INVENTION

In order to make objectives, technical solutions and advantages of the disclosure more clear and apparent, hereinafter, the technical solutions of the invention will be described in detail in connection with the specific embodiments and referring to the accompanying drawings.

In addition, in the following detailed description, in order to facilitate the explanation, a number of specific details are explained to provide a comprehensive understanding to the embodiments disclosed in the disclosure. However, it is obvious that one or more embodiments may be implemented without these specific details. In other cases, conventional structures and devices are shown in schematic diagrams to simplify the drawings.

According to a general concept of the disclosure, it is provided a touch screen comprising: a transparent substrate having a surface which includes a central region and a peripheral region; an electrode array arranged in the central region and formed by a plurality of driving electrodes and a plurality of sensing electrodes which are arranged on the surface of the transparent substrate; and multiple wires formed on the surface of the transparent substrate for electrically connecting each electrode in the electrode array to an external touch driving circuit, wherein all the electrodes in the electrode array and the multiple wires are formed of single-layer metal which is formed on the surface of the transparent substrate.

Figure 1:
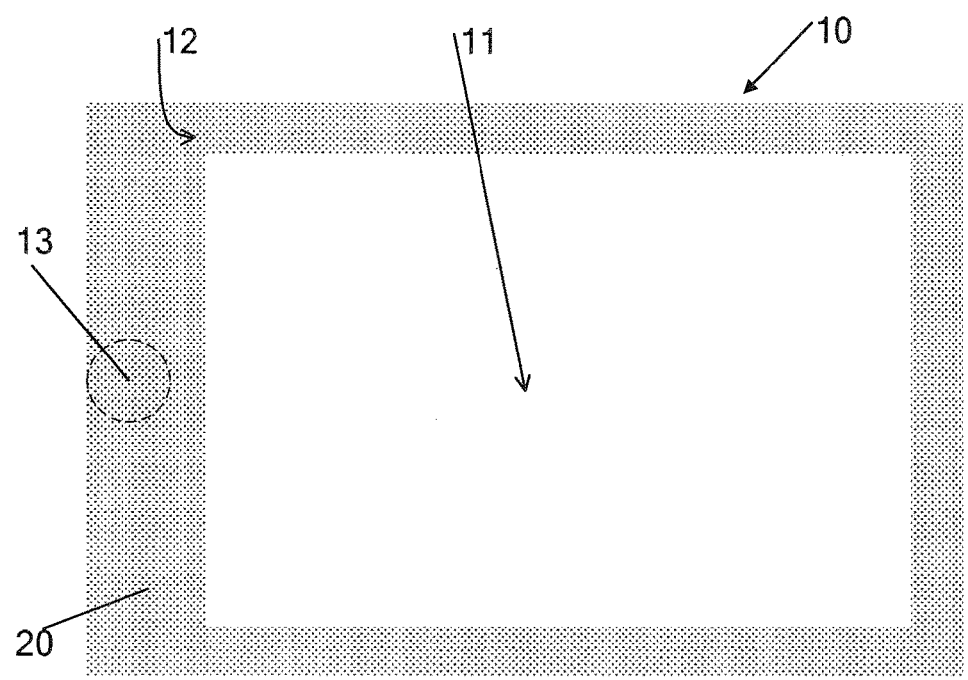
FIG. 1 is a plan view of a transparent substrate formed with a black matrix according to an embodiment of the present invention.
Figure 2:
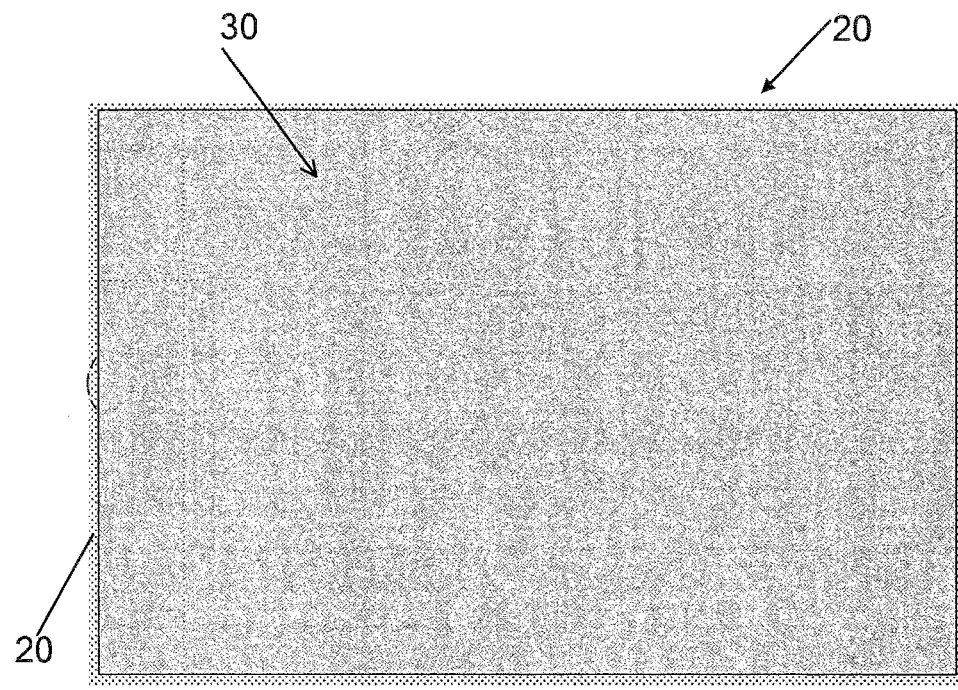
FIG. 2 is a plan view of a transparent substrate formed with a metal layer according to an embodiment of the present invention.
Figure 3:
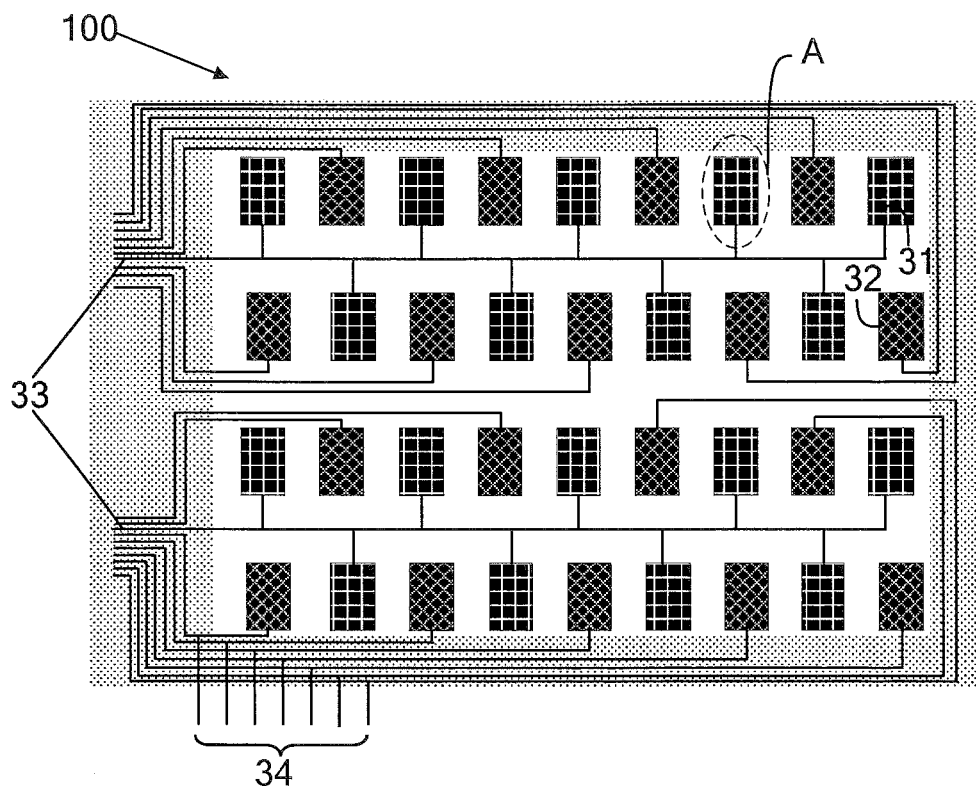
FIG. 3 is a plan view illustrating an arrangement of electrodes and wires of a touch screen according to an embodiment of the present invention.

FIGS. 1 to 3 show a method of manufacturing a touch screen used in a display device according to an exemplary embodiment of the disclosure. Firstly, providing a transparent substrate 10 which has a first surface and a second surface opposite to the first surface, the first surface including a central region 11 and a peripheral region 12 surrounding the central region 11, as shown in FIG. 1. For example, the transparent substrate 10 comprises a glass substrate, the first surface thereof faces toward a display screen (not shown) of the display device while the second surface thereof faces toward an user and is touched by the user. As described hereafter, there is a bonding pad portion or region of bonding pad 13 (dashed lines as shown merely indicate the region of bonding pad exemplarily, rather than an actual shape of the region of bonding pad) in the peripheral region 12, for example, in an end (left end in FIG. 1) of the transparent substrate 10, for connecting or converging wires of the electrodes of the touch screen.

Next, coating a photoresist on the first surface of the transparent substrate 10, and forming a black matrix 20 on the first surface through patterning processes such as exposure, development, etc. As shown in FIG. 1, the black matrix 20 is located in the peripheral region 12, so as to avoid that the wires in the peripheral region can be seen from the second surface of the transparent substrate (for example, refer to FIGS. 3 and 6).

Next, forming a single metal layer 30 on the first surface of the transparent substrate 10. As shown in FIG. 2, the metal layer 30 covers the central region 11 of the transparent substrate 10 and covers at least a portion of the peripheral region 12 and the black matrix 20 formed in the peripheral region 12. In an example, the metal layer 30 may be deposited on the entire first surface of the transparent substrate 10 through semiconductor processes such as sputtering, coating, etc. The metal layer 30 may be formed of material commonly used for manufacturing the electrode, such as copper, silver, molybdenum, aluminum, etc.

In the embodiment, as described hereafter, the metal layer 30 will be used to form driving electrodes, sensing electrodes and wires for connecting electrodes of the touch screen, and the formed metal layer 30 may be processed through a darkening and shadow eliminating process to eliminate light-reflecting phenomenon caused by the metal layer, so that it is difficult for the human to see traces of the formed electrodes and/or wires.

Then, patterning the metal layer 30 through a single patterning process so as to form a metal pattern 30' (refer to FIG. 5) comprising an electrode array in a form of grid located in the central region and multiple wires located in the peripheral region. As shown in FIG. 3, the electrode array comprises a plurality of driving electrodes 31 and a plurality of sensing electrodes 32, and the multiple wires are used for electrically connecting each electrode in the electrode array to an exterior touch driving circuit (not shown) through the region of bonding pad. The patterning process may include common semiconductor processes, such as exposure, development, etching, etc.

In an example, a protective layer 40 (refer to FIG. 5) may be formed on the entire first surface of the transparent substrate 10 after the electrodes and wires of the touch screen are formed, so as to prevent exposed metal layer from affecting the quality of product.

Figure 4:
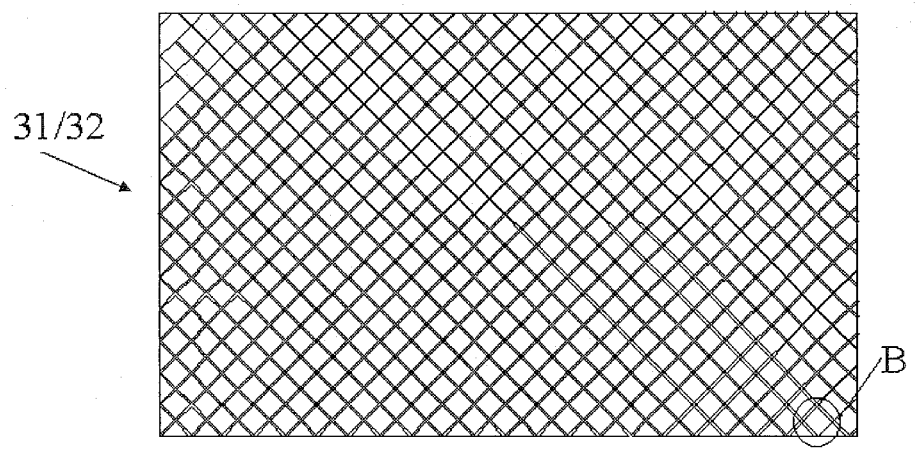
FIG. 4 is an enlarged schematic view of a portion "A" in FIG. 3, illustrating a structure of an electrode of a touch screen according to an embodiment of the present invention.

FIG. 4 is an enlarged schematic view of a portion "A" in FIG. 3. As shown, according to an embodiment, the driving electrode 31 and/or the sensing electrode 32 of the touch screen may have a grid structure consisted of a plurality of crossed metal traces. The driving electrode 31 and the sensing electrode 32 may have the same or different grid structure, which may be determined based on requirements such as aperture ratio, process, material, etc.

Figure 5:
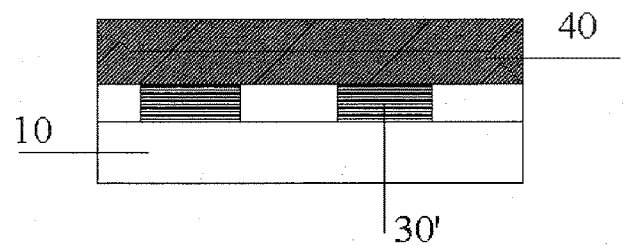
FIG. 5 is a section view of a portion "B" of the electrode in FIG. 4.

FIG. 5 is a section view of a portion "B" of the electrode in FIG. 4, in which a protective layer 40 covers the metal pattern 30' formed on the transparent substrate 10.

Figure 6:
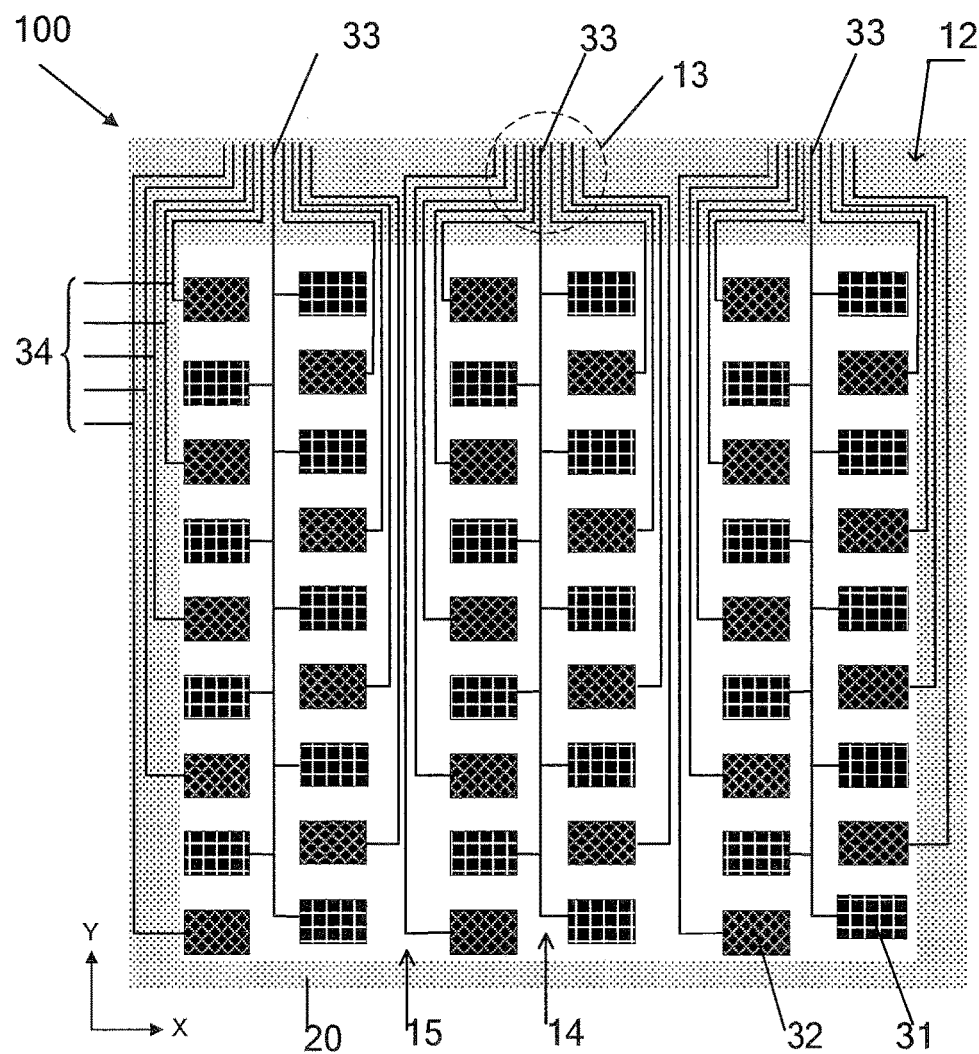
FIG. 6 is a plan view illustrating an arrangement of electrodes and wires of a touch screen according to another embodiment of the present invention.

Next, the structure of the touch screen according to the disclosure will be described with reference to FIGS. 3 and 6. As shown in FIG. 6, the electrode array of the touch screen 100 has a row direction X and a column direction Y, both the driving electrodes 31 and the sensing electrodes 32 are arranged alternately both in the row direction X and in the column direction Y and are spaced apart from each other, so as to form multiple rows of electrodes and multiple columns of electrodes. As shown, both in the row direction X and in the column direction Y, each pair of adjacent electrodes comprise a driving electrode 31 and a sending electrode 32 to form a mutual capacitance structure, so as to sense a touch position of the finger or other objects on the touch screen.

Herein, each two adjacent columns of electrodes may be referred as an electrode column pair. In the example shown in FIG. 6, six columns of electrodes constitute three electrode column pairs. In the example shown in FIG. 3, four columns of electrodes constitute two electrode column pairs. Obviously, the numbers of the rows and columns of the electrodes in the electrode array of the touch screen are not limited, and they may be selected based on requirements for product size, technological level and the like.

As shown in FIG. 6, multiple wires formed on the transparent substrate 10 may comprise multiple wires 33 for the driving electrode and multiple wires 34 for the sensing electrode. In an example, each wire 33 for the driving electrode may be electrically connected with all of the driving electrodes 31 in one corresponding electrode column pair, and the multiple wires 34 for the sensing electrode are electrically connected to respective sensing electrodes 32.

As shown in FIGS. 3 and 6, there are gap regions 14, 15 between two adjacent columns of electrodes in the electrode array. At least a portion of each wire 33 for the driving electrode is arranged in a first gap region 14 between two adjacent columns of electrodes of one corresponding electrode column pair. The wires 34 for the sensing electrode, which are electrically connected with two outermost columns of sensing electrodes in the electrode array, are arranged in the peripheral region 12, and at least a portion of the wires 34 for the sensing electrode, which are electrically connected with the sensing electrodes in the electrode array other than two outermost columns of sensing electrodes, are arranged in a second gap region 15 between two adjacent electrode column pairs. All the wires 33, 34 of the touch screen extend or converge to a region 13 of bonding pad located at one end of the transparent substrate 10 in the peripheral region 12, and all the wires 33, 34 in the peripheral region 12 overlap with the black matrix 20, so as to avoid that the metal traces may be seen from the second surface (i.e. touch surface) of the touch screen.

In the examples as shown in FIGS. 3 and 6, there are a plurality of regions 13 of bonding pad at one end of the transparent substrate 10, and all the wires, which are electrically connected with the electrodes in each electrode column pair converge to the region of bonding pad corresponding to the electrode column pair, so as to avoid that there are too much pin wires in one region of bonding pad or the pin wires are too concentrated. Obviously, in a case that the number of the wires for the electrodes of the touch screen is allowed, it is also possible to converge all the wires to one region of bonding pad.

In the example as shown in FIG. 6, a manner in which all the wires are routed at one end may be used. Specifically, each wire 34 for the sensing electrode extends from the respective sensing electrode 32 toward the end of the substrate 10 in a first direction (an upward direction in FIG. 6) parallel with the column direction Y and converges to the region 13 of bonding pad. This may be used for suitable number of wires.

In a case of large number of wires, a manner in which wires are routed at two ends may be used. As shown in FIG. 3, wires, which are electrically connected with a portion of sensing electrodes 32 in one column of electrodes, may extend from the respective sensing electrodes toward the end of the substrate 10 in a first direction (a direction toward the left in FIG. 3) parallel with the column direction Y and converge to the region 13 of bonding pad; and wires, which are electrically connected with the other sensing electrodes 32 in the at least one column of electrodes, extend from the respective sensing electrodes toward the other end (the right end in FIG. 3) of the transparent substrate 10 opposite to the end in a second direction (a direction toward the right in FIG. 3) opposite to the first direction, then extend toward the end (the left end in FIG. 3) of the substrate 10 along the peripheral region 12 and converge to the region 13 of bonding pad.

Therefore, the driving electrodes, the sensing electrodes and the wires for connecting the electrodes of the touch screen may be simultaneously formed of single-layer metal which is directly formed on the transparent substrate, so that the manufacturing process is simplified and the cost is reduced. Moreover, as the impedance of metal is obviously less than that of ITO, the length of the wire is nearly not limited; and the width of the metal traces forming the electrode and the wire may be determined depending on the process, the electrode arrangement, the requirement of product, etc. for example, the width may be 5 µm, 3 µm, 2.5 µm, or even less, which is obviously less than the width of the existing ITO wire, thereby arranging much wires in the wiring region, so as to support larger-size product.

The product comprising the touch screen according to the disclosure may include a display device which may realize both display function and touch function, for example, a liquid crystal display device such as liquid crystal panel, liquid crystal television, cellphone, e-book, tablet computer, etc. Except for the liquid crystal display device, a display device comprising the touch screen according to the above embodiments may be an OLED display.

Though the embodiments of the present invention have been illustrated and described, it should be noted that those skilled in the art can make several modifications thereto without departing from the principle and spirit of the present invention, and the scope of the present invention should be defined by the appended claims and the equivalents thereof.

What is claimed is:

1. A touch screen comprising:
   a transparent substrate having a surface which includes a central region and a peripheral region;
   an electrode array arranged in the central region and formed by a plurality of driving electrodes and a plurality of sensing electrodes, which are arranged on the surface of the transparent substrate; and
   multiple wires formed on the surface of the transparent substrate for electrically connecting a respective electrode in the electrode array to an external touch driving circuit,
   wherein all the electrodes in the electrode array and the multiple wires are formed of a single-layer metal which is formed on the surface of the transparent substrate,
   the electrode array has a row direction and a column direction,
   both the driving electrodes and the sensing electrodes are alternately arranged in both the row direction and the column direction and are spaced apart from each other, so as to form multiple rows of electrodes and multiple columns of electrodes,
   each two adjacent columns of electrodes constitute an electrode column pair,
   each electrode column pair corresponds to one wire for the driving electrode and multiple wires for the sensing electrode, the one wire for the driving electrode is electrically connected with all of the driving electrodes in the electrode column pair, and each of the multiple wires for the sensing electrode is electrically connected with one corresponding sensing electrode in the electrode column pair,
   at least a portion of each wire for the driving electrode is arranged in a gap region between two adjacent columns of electrodes of one corresponding electrode column pair;
   the wires for the sensing electrode, which are electrically connected with two outermost columns of sensing electrodes in the electrode array, are arranged in the peripheral region;
   at least a portion of the wires for the sensing electrode, which are electrically connected with the sensing electrodes in the electrode array other than the two outermost columns of sensing electrodes, are arranged in a gap region between two adjacent electrode column pairs; and
   all the multiple wires are converged to a region of bonding pad located at one end of the transparent substrate in the peripheral region.

2. The touch screen according to claim 1, wherein, each electrode in the electrode array has a form of grid.

3. The touch screen according to claim 1, wherein, the wires for the sensing electrode extend from the respective sensing electrodes toward the one end in a first direction parallel with the column direction and converge to the region of bonding pad.

4. The touch screen according to claim 1, wherein, wires, which are electrically connected with a portion of sensing electrodes in at least one column of electrodes of the multiple columns of electrodes, extend from the respective sensing electrodes toward the one end in a first direction parallel with the column direction and converge to the region of bonding pad; and
   wires, which are electrically connected with the other sensing electrodes in the at least one column of electrodes, extend from the respective sensing electrodes toward the other end of the transparent substrate opposite to the one end in a second direction opposite to the first direction, then extend along the peripheral region and converge to the region of bonding pad.

5. The touch screen according to claim 1, further comprising a black matrix forming in the peripheral region, wherein the black matrix is located under the wires in the peripheral region to avoid that the wires in the peripheral region is visible from the other surface of the transparent substrate opposite to the surface.

6. A display device comprising a touch screen according to claim 1.

7. A manufacturing method of a touch screen, comprising steps of:
providing a transparent substrate having a surface including a central region and a peripheral region;
forming a metal layer on the surface; and
patterning the metal layer through a single patterning process to form an electrode array in a form of grid in the central region and to form multiple wires in the peripheral region, the electrode array comprising a plurality of driving electrodes and a plurality of sensing electrodes, and the multiple wires being configured for electrically connecting each electrode in the electrode array to an external touch driving circuit,
wherein patterning the metal layer through a single patterning process comprises: forming the driving electrodes and the sensing electrodes, which are spaced apart from each other, alternately both in a row direction of the electrode array and in a column direction thereof,
wherein, patterning the metal layer through a single patterning process comprises:
forming an electrode column pair from each two adjacent columns of electrodes:
forming multiple wires for the driving electrode and multiple wires for the sensing electrode from the metal layer;
wherein each wire for the driving electrode is electrically connected with all of the driving electrodes in one corresponding electrode column pair, and the multiple wires for the sensing electrode are electrically connected with respective sensing electrodes in the corresponding electrode column pair,
wherein, patterning the metal layer through a single patterning process comprises:
forming at least a portion of each wire for the driving electrode in a first gap region between two adjacent columns of electrodes of the electrode column pair;
forming the wires for the sensing electrode, which are electrically connected with two outermost columns of sensing electrodes in the electrode array, in the peripheral region;
forming at least a portion of the wires for the sensing electrode, which are electrically connected with the sensing electrodes in the electrode array other than two outermost columns of sensing electrodes, in a second gap region between two adjacent electrode column pairs, the second gap region being spaced apart from the first gap region by a column of electrodes; and
converging all the multiple wires to a region of bonding pad located at one end of the transparent substrate in the peripheral region.

8. The manufacturing method according to claim 7, wherein, patterning the metal layer through a single patterning process comprises: forming each electrode in the electrode array in a form of grid.

9. The manufacturing method according to claim 7, wherein, patterning the metal layer through a single patterning process comprises:
configuring wires for the sensing electrode to extend from the respective sensing electrodes toward the one end and converge to the region of bonding pad.

10. The manufacturing method according to claim 7, wherein,
wires, which are electrically connected with a portion of sensing electrodes in at least one column of electrodes, extend from the respective sensing electrodes toward the one end in a first direction parallel with the column direction and converge to the region of bonding pad; and
wires, which are electrically connected with the other sensing electrodes in the at least one column of electrodes, extend from the respective sensing electrodes toward the other end of the transparent substrate opposite to the one end in a second direction opposite to the first direction, then extend along the peripheral region and converge to the region of bonding pad.

11. The manufacturing method according to claim 7, further comprising:
forming a black matrix in the peripheral region before forming the metal layer on the surface, such that the metal layer formed subsequently in the peripheral region is stacked on the black matrix.

12. The manufacturing method according to claim 7, further comprising:
processing the formed metal layer through a blackening and shadow eliminating process.

13. The manufacturing method according to claim 7, further comprising:
forming a protective layer covering the electrode array and the multiple wires on the surface.

* * * * *